March 24, 1959

F. STANEK 2,878,748

BREAD TOASTER

Filed Nov. 7, 1955

INVENTOR.
Frank Stanek
BY Rodney Bedell
Atty.

March 24, 1959  F. STANEK  2,878,748
BREAD TOASTER
Filed Nov. 7, 1955  2 Sheets-Sheet 2
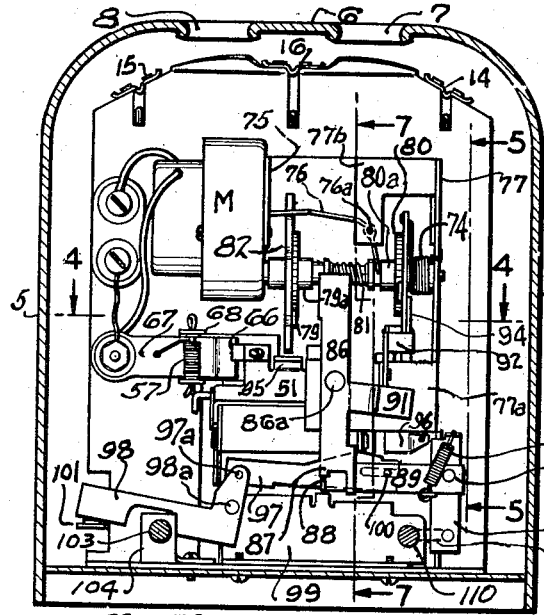
INVENTOR.
Frank Stanek
BY Rodney Bedell
Atty.

United States Patent Office 2,878,748
Patented Mar. 24, 1959

2,878,748

BREAD TOASTER

Frank Stanek, St. Louis County, Mo., assignor to The Toastwell Company, Inc., St. Louis, Mo., a corporation of Missouri Application November 7, 1955, Serial No. 545,279

6 Claims. (Cl. 99—328)

The invention relates to automatic electric toasters intended primarily for household use, although the structure described may be used in commercial toasters also.

One object of the invention is to provide a simple combination of heating and timing structure whereby a single electric circuit energizes the resistance heating elements and a motor which drives the mechanism to open the circuit at the end of a predetermined period.

Another object is to initiate a circuit closing and timing mechanism by the deposit of a slice of bread or the like in the heating compartment and to project the slice from the heating compartment slowly upon the completion of the toasting operation.

Another object is to effect the above results by the continuous operation of a motor and to avoid storing up energy in springs to open the electric circuit or to project the slice.

Another object is to avoid the use of a spring actuated clock mechanism for timing the operation.

These and other detail objects as will appear below are attained by the structure shown in the accompanying drawings, in which:

Figure 3 is a vertical transverse section on line 3—3 of Figure 2.

Figure 4 is a detail horizontal section on line 4—4 of Figure 3.

Figure 5 is a detail longitudinal vertical section and side elevation on line 5—5 of Figure 3.

Figure 1:
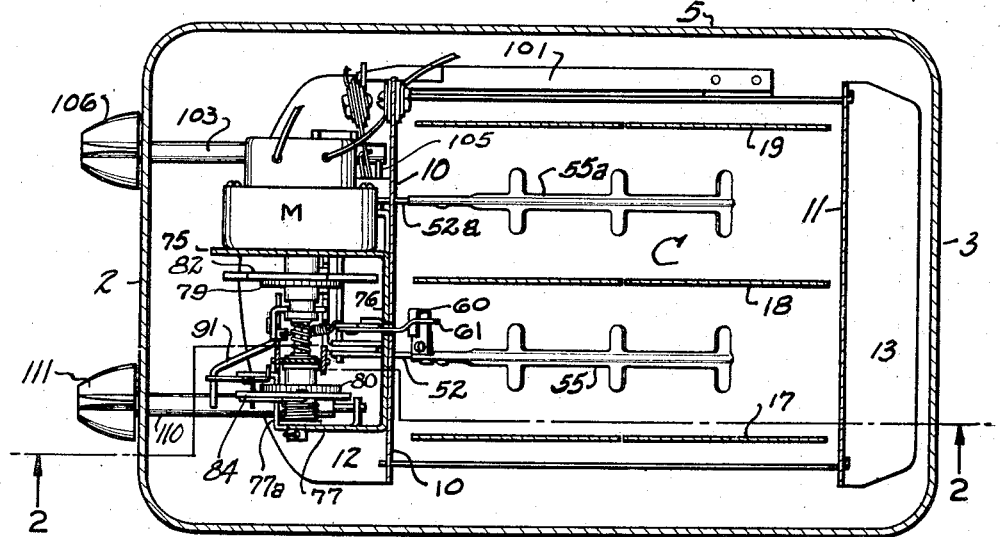
Figure 1 is a horizontal section through a toaster housing on the line 1—1 of Figure 2 and showing a substantial portion of the toaster structure in top view.

Figure 6 corresponds to Figure 5 but shows the parts in a different position.

Figure 7 is a detail vertical longitudinal section corresponding to Figure 3 but showing the parts in a different position.

Figure 8 is a detail end view corresponding to Figure 3 but showing the same in a different position.

Figure 9 is a similar detail view showing the parts in another position.

The toaster housing comprises a bottom plate 1, upright end walls 2, 3, upright side walls 4, 5. The end and side walls merge with a top wall 6 slotted at 7 and 8 to receive a slice of bread or the like to be toasted. Upright frame plates 10, 11 extend transversely of the housing and are flanged horizontally at their lower ends at 12 and 13, respectively, for mounting on bottom plate 1. Plates 10 and 11 are connected by horizontal braces 14, 15, and 16. Flat electric heating resistance elements 17, 18, 19 have strips 20 at their upper and lower edges which are seated in slots in upright plates 10, 11.

A bracket 50 projects from the lower portion of end plate 10. A yoke-like control member 51 extends transversely of the toaster with its inturned arms 52, 52a pivoted at 51a on bracket 50 and extending into the heating chamber C and forming part of a slice-carrier supporting linkage. A link 53, paralleling arm 52, is pivoted on the end of bracket 50 near the yoke pivot 51a. Arm 52, near the toaster side wall 4, has a pivotal mounting 54a for the corner of an angle member 54, having a short depending leg pivoted at its lower end to link 53. Angle 54 has a relatively long horizontal leg, the outer end of which has a pivotal mounting 55b for a slice-carrier 55 extending over the long leg of angle 54 and yieldingly positioned thereon by a tension spring 56. Near the opposite toaster side wall 5 a corresponding slice-carrier 55a is directly pivoted to and stably supported in horizontal position by the inner ends of arm 52a and a link (not shown) like link 53.

Figure 2:
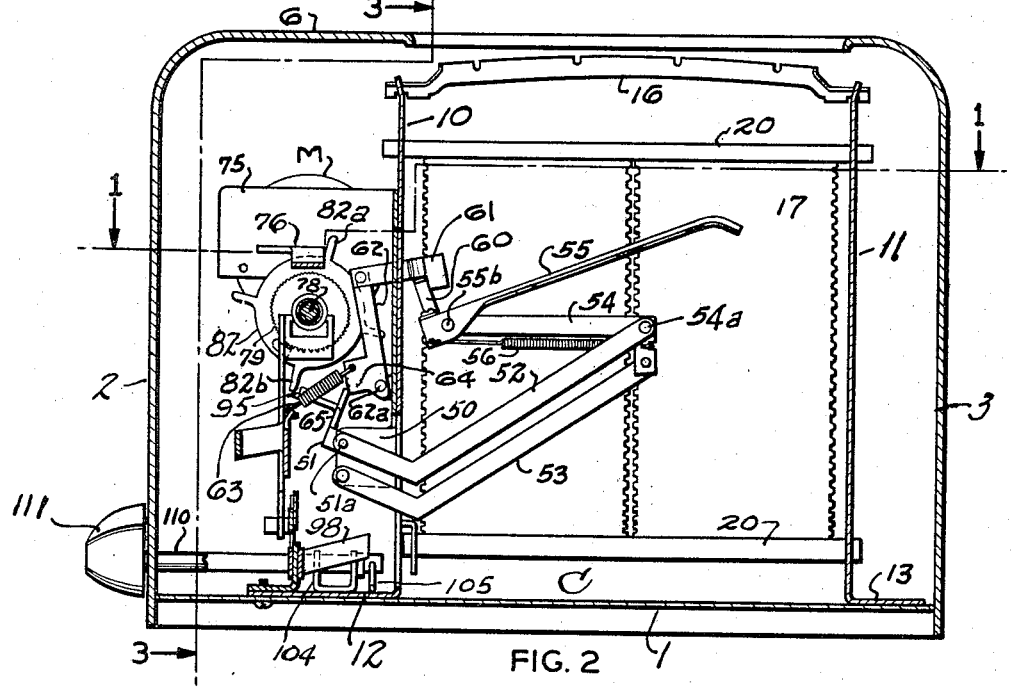
Figure 2 is a vertical longitudinal section on the line 2—2 of Figure 1 showing the parts in normal inoperative position.

Figure 2 shows the parallel linkage 52, 53 and carrier 55 in normally inactive position in which an upstanding finger 60 on carrier 55 is engaged by a latch 61 hinged freely on the upper end of a lever 62 pivoted at 62a on end plate 10. A spring 63 thrusts lever 62 to the left. On the lower end of lever 62 is a lug 64 abutting an upstanding ear 65 on yoke 51 and holding the latter against clockwise movement about its pivot 51a by the weight of the parallel linkage and the carriers. In this position of the yoke, a spring finger 66 (Figure 4) projecting from the left hand end of the yoke engages the inner end of a stiff switch blade 67, pivoted at 67a on a bracket 68 on end plate 10. The outer end of finger 67 carries a switch contact 69 normally spaced from a stationary switch contact 70 on end plate 10.

When a bread slice is deposited upon the carrier 55, the weight of the same tilts the carrier on its pivot 55b, thus moving finger 60, latch 61, and lever 62 clockwise from the position shown in Figure 2 and releasing yoke ear 65 from lug 64, whereupon the weight of the linkage, carriers and the slice, swings the yoke clockwise about its pivot and, through finger 66, moves blade 67 counterclockwise (Figure 4) until the end of the finger slips off the end of blade 67 and a torsion spring 57 (Figure 3) snaps blade 67 into switch closing position.

A single toaster circuit, including heating elements 17, 18, 19 is closed by switch 67, 69, 70 and this circuit also energizes a high speed motor M mounted upon the flange 75 of a bracket on end plate 10, channel shaped in plan view (Figure 1) and including a flange 77 spaced from flange 75. Motor M has a reduction gear to a drive shaft 78, journaled in the motor housing and in bracket flange 77, of rectangular cross section throughout a portion of its length. Gears 79, 80, having respective hubs 79a, 80a, are slidable lengthwise of shaft 78 but rotate with the same. A spring 81 surrounds shaft 78 and thrusts the hubs of gears 79, 80 apart. A star wheel 82 near flange 75 has a hub rotatable on shaft 78 with an end bearing against a shoulder on the motor shaft. The star wheel has a fixed pawl 83 engaged by gear 79 when the latter is advanced on shaft 78 by spring 81 and disengaged when gear wheel 79 is retracted. Gears 79, 80 and spring 81 form parts of clutch structure for connecting the motor to timing mechanisms.

A cam 84 near bracket flange 77 has a hub rotatable on shaft 78 with an end bearing against flange 77. Cam 84 has a fixed pawl 85 engaged by gear 80 when the latter is advanced on shaft 78 by spring 81 and disengaged when gear 80 is retracted. A torsion spring 74 is coiled around the cam hub with its ends secured to the cam and to flange 77, respectively. The spring is tensed as the cam is rotated clockwise by gear 80 and snaps the cam back to the position shown in Figure 5 when gear 80 is disengaged.

Each gear hub is grooved to receive the lip of individual shifters 86 and 76, whereby the gears are positively moved away from the star wheel and cam, respectively, during different portions of the cycle of operations, the shifter 86 for star wheel gear 79 being actuated by cam 84 and the shifter 76 for cam gear 80 being actuated by star wheel 82. Shifter 86 for star wheel gear 79 comprises an upright pivoted at 86a on a bracket 77a. In inoperative condition of the toaster, a lug 87 on the lower end of shifter 86 is engaged by a lip 88 on an arm 89 pivoted at 89a on a bracket 77b and yieldingly supported by a spring 90. A finger 91 extends laterally from shifter 86 below its pivot 86a and extends below a bell crank 92 (Figure 5) pivoted on bracket 77c and normally seating on the top edge of the bracket. A dog 94 pivoted at 94a on cam 84 and normally seating on a cam lug 84a engages bell crank 92 when cam 84 rotates clockwise from the initial position shown in Figure 5, and thereby moves finger 91 downwardly and rotates shifter 86 clockwise to the position shown in Figure 8 and withdraws gear 79 from star wheel 82. With continued rotation of cam 84, dog 94 rides over the top of bell crank 92 and spring 90 lifts arm 89 so that its lip 88 is received in the notch in the lower end of shifter 86 to oppose the side of lug 87 and prevent the engaging of gear 79 with star wheel 82.

As cam 84 continues to rotate and approaches the position shown in Figure 6, it moves a vertically disposed slide 96 downwardly on bracket 77c until the lower end of the slide engages the right hand end of a link 97, pivoted at 97a (Figure 3) on an offset crank 98 pivoted at 98a on base bracket 99. Link 97 is slotted horizontally at its right hand end to receive and ride on pin 100 on arm 89, so that downward movement of the right hand end of link 97 by slide 96 moves arm 89 to the position shown in Figure 8. This releases shifter lug 87 from lip 88, permitting spring 81 to return shifter 86 to the original position shown in Figure 3 and engage gear 79 and star wheel 82. Following such engagement, the rotation of the star wheel moves one of its fingers 82a to engage the underside of the cam-gear shifter 76 (Figure 3), pivoted at 76a to a bracket 77d, and tilts shifter 76 so that the lower end of the shifter, seated in a groove in gear hub 80a, retracts gear 80 from cam 84 (Figure 9), thus releasing cam 84 from shaft 78. Thereupon spring 74 snaps cam 84 back to its original position. In doing so, the swinging end of dog 94 rides over bell crank 92 and back to its initial position, indicated in Figure 5, where it can reengage the bell crank to rotate shifter 86 upon the next cycle of operation.

As star wheel 82 continues to rotate, its finger 82b, opposite to finger 82a, engages an outer ear 95 on yoke 51 (Figure 9), rotating the latter in an anti-clockwise direction and raising linkages 52, 53 and carrier 55, and corresponding linkage for carrier 55a, and slices thereon. During this movement, carrier finger 60 contacts and raises pivoted latch 61. Also spring finger 66 is moved away from plate 10 from its broken line position in Figure 4, sliding over the end of blade 67 to reengage the latter as shown in solid lines.

As star finger 82b rides over the outer edge of ear 95 and releases yoke 51 the latter rotates a short distance clockwise (Figure 2), due to the weight of the linkage and carriers and the slices thereon, to the extent permitted by latch 61. This rotation causes finger 66 (Figure 4) to engage the right hand end of switch blade 67 and move it towards plate 10 a short distance, thereby opening the circuit and terminating the toaster cycle.

A bimetal thermostat strip 101 adjacent to heater 19 (Figures 1, 3) distorts upwardly when heated and tilts offset crank 98 to shift link 97 to the right (Figure 3). The upper right hand edge of link 97 is stepped or inclined so that it is engaged by downward movement of slide 96 earlier or later in the period of rotation of cam 84, thus shortening or lengthening the toasting period by releasing shifter 86 and engaging gear 79 and star wheel 82 more promptly than when the thermostat is cold.

A shaft 110 journaled on base bracket 99 carries a crank 112, whereby arm 89 may be adjusted manually by knob 111 to vary the distance traveled by slide 96 downwardly before engaging link 97 and releasing shifter 86, thus varying the toasting period manually as may be desired to produce lighter or darker toast.

A shaft 103 is journaled on base clips 104 and at its inner end carries an arm 105 (Figures 1, 2, 7) underlying the diagonally disposed outer end of the lower links for carrier 55a corresponding to link 53. A knob 106 on the outer end of shaft 103 provides for the ready manual rotation of the latter, whereby arm 105 may be moved upwardly and yoke 51 rotated to raise the slice carriers at any time during the cycle of operations. If the slice is removed, the toaster is immediately ready for the insertion of another slice, whereupon the switch will be closed and the toasting cycle initiated. If the slice is merely inspected without being removed and the knob released and the slice lowered, the previous toasting cycle continues until automatically terminated as above described.

Summarizing the operation; placing a bread slice on the carrier frees ear 65 from lug 64 and the weight of the slice and carrier swings control yoke 51 clockwise to free switch blade 67 for switch closing movement by its spring 57, thus energizing the heaters and the motor, which rotates gear 80 and cam 84. The latter, through dog 94, moves bell crank 92 counterclockwise to depress finger 91 and move shifter 86 from its initial position (Figure 1) to the left to free star wheel 82 from gear 79, the shifter being held in its latter-mentioned position by lug 88 and the star wheel remaining stationary. Cam 84 continues to rotate and moves slide 96 downwardly slowly throughout most of the toasting period until the slide moves lug 88 and frees shifter 86, whereupon spring 81 moves gear 79 into engagement with star wheel 82 which rotates slowly with its finger 80a lifting shifter 76 to disengage gear 80 from cam 84, whereupon spring 74 returns the latter to its original Figure 1 position with dog 94 behind bell crank 92. At this time, star wheel finger 82b engages yoke ear 95 to turn the yoke counterclockwise and moves yoke spring finger 66 outwardly of switch blade 67, at which time star wheel finger 82b rides off the end of yoke ear 95 permitting the latter to move back slightly to shift the switch blade to switch opening position. Simultaneously, yoke 50 lifts the carrier and tilts lever 62 to the right and advances latch 61 so that it is in position to engage finger 60 as the carrier reaches its uppermost position.

At the same time star wheel finger 80a moves out from under the left hand end of shifter 76, permitting the latter to drop and move gear 80 to the right to engage cam 84, thus returning the parts to their original starting positions.

Obviously the details may vary substantially without departing from the spirit of the invention and the exclusive use of those modifications coming within the scope of the claims is contemplated.

What is claimed is:

1. In a toaster including electric resistance heating elements, an energizing circuit therefor and a switch for opening and closing the circuit, a motor in the circuit having a drive shaft, spaced discs rotatable on said drive shaft, individual clutch means for operably connecting the drive shaft to each of said discs, spring means thrusting said clutch means into functioning position, a device actuated by rotation of each of said discs with said shaft for disengaging the other disc and its clutch element against the thrust of said spring means, a slice carrier, means actuated by rotation of one of said discs to move said slice carrier to elevated position and to open said switch, means actuated by rotation of the other of said discs for timing the toasting operation and means actuated by the weight of a slice on said carrier for closing the switch.

2. In a toaster having a heating chamber with electric resistance heaters, a circuit therefor, a frame part, a slice carrier in said chamber movable upwardly and downwardly thereon by swinging about a pivot on said frame part, a switch for said circuit closed by the lowering of the carrier, a motor in said circuit, including a drive shaft, gears slidably and non-rotatably mounted on said shaft, a cam rotatable on said shaft and having an element for cyclically engaging one of said gears, a star wheel rotatable on said shaft and having an element for cyclically engaging the other of said gears, a spring thrusting said gears along the shaft into contact with said elements, means actuated by said cam to move the star wheel gear along the shaft out of contact with said star wheel element, means actuated by said star wheel to move the cam gear along the shaft out of contact with said cam element, and means actuated by said star wheel when rotated by its associated gear to open said circuit.

3. In a bread toaster, a frame part, electric resistance elements, a circuit therefor including a switch blade spring-pressed to closing position, a slice carrier mounted on said frame part and movable downwardly by gravity from an inactive elevated position when a slice is deposited thereon, a motor in said circuit having a shaft, driving elements fixed on said shaft, driven elements rotatably mounted on said shaft and respectively engageable with and disengageable from said driving elements simultaneously during successive periods in a cycle of operation of said motor, a switch and carrier control member mounted on the frame and movable by one of said driven elements to elevate the carrier and to open the switch, a latch pivoted on the frame for holding the carrier elevated, a timing cam movable by the other driven element to disengage said member-movable element from its driving element, the carrier being movable downwardly by a slice placed thereon to release the latch, and a connection between the carrier and the control member for moving the latter independently of the associated driving element to free the switch blade when the carrier moves downwardly.

4. In a bread toaster, a stationary frame, electric resistance heating elements, a circuit therefor including a switch, a slice carrier alongside the heating elements and movable between elevated and lowered positions, a motor in said circuit, a shaft actuated thereby, driven members spaced apart on said shaft and rotatably supported thereon, each having a tooth-like element extending therefrom lengthwise of the shaft, clutch structure comprising a disc adjacent each of said driven members and slidable along the shaft and a coil spring compressed between said discs, each disc having teeth for engaging the element on the corresponding driven member, an individual shifter for each disc pivoted on the frame to move lengthwise of the shaft and disengage the corresponding disc from the associated driven member, each disc having a radial projection for actuating the other of said shifters as the disc radial projection reaches a cyclic point in the rotation of the shaft to release the corresponding clutch structure for the other disc and member whereupon the spring may engage the latter mentioned disc and member, a lever pivoted on the frame and movable to raise said slice carrier and open said switch, and a second radial projection on one of said driven members engageable with said lever to swing it on its pivot as described at a cyclic point in the rotation of the shaft.

5. A bread toaster structure as described in claim 4 in which a thermostat is operatively connected to one of said shifters to vary its position relative to its actuating radial projection and thereby control the timing of the lever actuating connection.

6. In a bread toaster having a heating chamber, a stationary frame, a support device pivoted thereon with a swinging end extending into said chamber to move vertically therein, a holding latch mounted on the frame and engaging said support device, when said end is in raised position, to hold the support device elevated, a slice carrier pivoted on said support device to swing vertically in said chamber, said carrier being movable on said support by the weight of a slice deposited on the carrier to engage said latch and release said support device therefrom, said support device and carrier being movable downwardly by gravity about the support device pivot when said latch is released, the toaster including an electric circuit with a switch, a motor in said circuit, a part of the holding latch retaining said switch in open position when the support device is raised, an operating shaft driven by said motor, and a radially extending element on said shaft engaging said support device to swing it on its pivot on the frame to elevate the projecting end of the device in the heating chamber, the holding latch automatically engaging said support and the switch blade when the support is elevated.

References Cited in the file of this patent

UNITED STATES PATENTS

| | | |
|---|---|---|
| 1,900,737 | Rohne | Mar. 7, 1933 |
| 2,347,385 | Wright et al. | Apr. 25, 1944 |
| 2,361,446 | Anderson | Oct. 31, 1944 |
| 2,542,231 | Campbell | Feb. 20, 1951 |
| 2,548,680 | Olson et al. | Apr. 10, 1951 |
| 2,667,828 | Koci | Feb. 2, 1954 |
| 2,693,143 | Ireland | Nov. 2, 1954 |
| 2,724,322 | Parr | Nov. 22, 1955 |
| 2,734,448 | McCullough | Feb. 14, 1956 |
| 2,835,192 | Sivacek | May 20, 1958 |